(12) United States Patent
Esparza et al.

(10) Patent No.: US 9,084,429 B2
(45) Date of Patent: Jul. 21, 2015

(54) FOOD TRAY AND TRAY INSERT

(71) Applicants: Fernando Esparza, Oswego, IL (US);
Tim Traylor, Bolingbrook, IL (US)

(72) Inventors: Fernando Esparza, Oswego, IL (US);
Tim Traylor, Bolingbrook, IL (US)

(73) Assignee: Restaurant Technology, Inc., Oak Brook, IL (US)

( * ) Notice: Subject to any disclaimer, the term of this patent is extended or adjusted under 35 U.S.C. 154(b) by 0 days.

(21) Appl. No.: 14/089,954

(22) Filed: Nov. 26, 2013

(65) Prior Publication Data

US 2014/0076177 A1 Mar. 20, 2014

Related U.S. Application Data

(62) Division of application No. 11/473,439, filed on Jun. 23, 2006, now Pat. No. 8,601,941.

(51) Int. Cl.
| | | |
|---|---|---|
| *A47J 39/00* | (2006.01) | |
| *A21B 3/15* | (2006.01) | |
| *A47J 37/06* | (2006.01) | |
| *A47J 37/07* | (2006.01) | |

(52) U.S. Cl.
CPC ............... *A21B 3/155* (2013.01); *A47J 37/067* (2013.01); *A47J 39/006* (2013.01); *A47J 37/0704* (2013.01)

(58) Field of Classification Search
CPC ....... A47J 39/006; A47J 37/067; A21B 3/155
USPC ................. 219/214, 385, 386, 394, 399, 521; 99/369, 371, 476, 483, 449, 450
See application file for complete search history.

(56) References Cited

U.S. PATENT DOCUMENTS

| | | | |
|---|---|---|---|
| 466,416 A | * | 1/1892 | Hart .............................. 220/4.21 |
| 2,204,681 A | | 6/1940 | Kircher |
| 2,732,696 A | * | 1/1956 | Baker ............................. 99/446 |
| 3,130,288 A | | 4/1964 | Monaco et al. |
| 4,603,052 A | * | 7/1986 | El-Hag et al. .................. 426/523 |
| 4,870,233 A | * | 9/1989 | McDonald et al. ........... 219/730 |
| 5,549,040 A | | 8/1996 | Naramura |
| 5,590,586 A | | 1/1997 | Ulfig et al. |
| 5,724,886 A | | 3/1998 | Ewald et al. |
| 5,783,803 A | | 7/1998 | Robards, Jr. |
| 5,900,173 A | | 5/1999 | Robards, Jr. |
| 5,947,012 A | | 9/1999 | Ewald et al. |
| 5,948,301 A | | 9/1999 | Liebermann |
| 6,011,243 A | | 1/2000 | Arnold et al. |
| 6,116,154 A | | 9/2000 | Vaseloff |
| 6,119,587 A | | 9/2000 | Ewald et al. |
| 6,175,099 B1 | | 1/2001 | Shei et al. |
| 6,209,447 B1 | | 4/2001 | Ewald et al. |
| 6,262,394 B1 | | 7/2001 | Shei et al. |
| 6,265,695 B1 | | 7/2001 | Liebermann |
| 6,358,548 B1 | | 3/2002 | Ewald et al. |
| 6,384,380 B1 | | 5/2002 | Faries, Jr. et al. |
| 6,384,381 B2 | | 5/2002 | Witt et al. |
| 6,412,403 B1 | | 7/2002 | Veltrop |
| 6,541,739 B2 | | 4/2003 | Shei et al. |
| 6,607,766 B2 | | 8/2003 | Ewald et al. |
| 6,637,322 B2 | | 10/2003 | Veltrop |

(Continued)

*Primary Examiner* — Thien S Tran
(74) *Attorney, Agent, or Firm* — Hinshaw & Culbertson LLP

(57) ABSTRACT

A food tray and tray insert are provided that are particularly adapted for use in a heated food holding compartment. Methods of storing cooked food are also provided using such devices. The devices and use thereof allows cooked food such as hamburger patties to be stored at elevated temperatures for extended periods of time without a significant deleterious effect on the organoleptic properties of the cooked food.

20 Claims, 8 Drawing Sheets

(56) References Cited

U.S. PATENT DOCUMENTS

| | | |
|---|---|---|
| 6,658,994 B1 | 12/2003 | McMillan |
| 6,878,391 B2 | 4/2005 | Veltrop |
| 6,884,451 B2 | 4/2005 | Veltrop |
| 2001/0007322 A1 | 7/2001 | Shei et al. |
| 2002/0012729 A1* | 1/2002 | Ewald et al. .............. 426/418 |
| 2002/0100756 A1 | 8/2002 | Veltrop |
| 2002/0108955 A1* | 8/2002 | Erb ..................... 220/359.4 |
| 2002/0121509 A1 | 9/2002 | Shei et al. |
| 2002/0172742 A1 | 11/2002 | Veltrop |
| 2002/0189205 A1* | 12/2002 | Hart et al. ................ 53/447 |
| 2003/0118706 A1 | 6/2003 | Veltrop |
| 2004/0033297 A1 | 2/2004 | Lee et al. |

\* cited by examiner

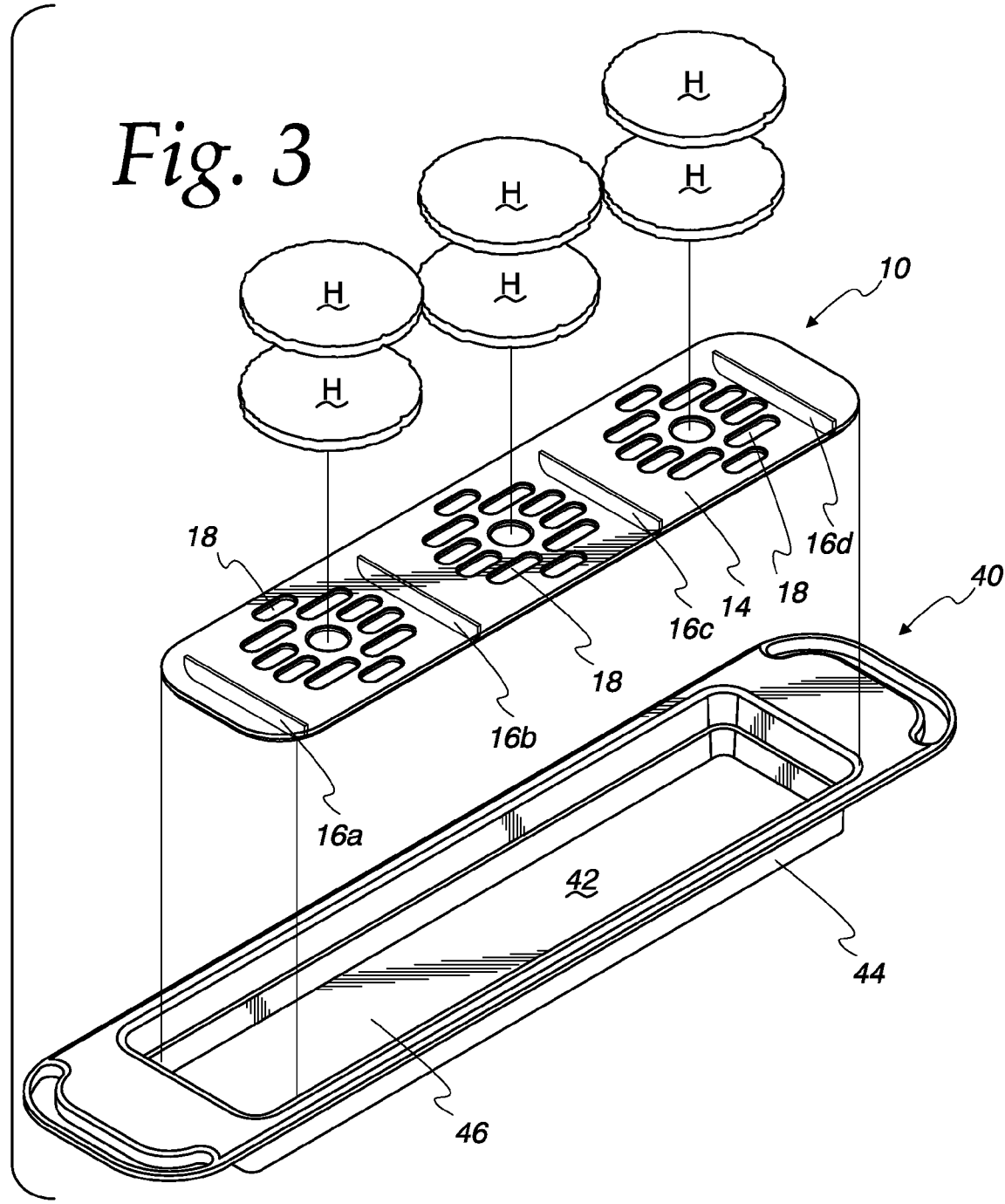

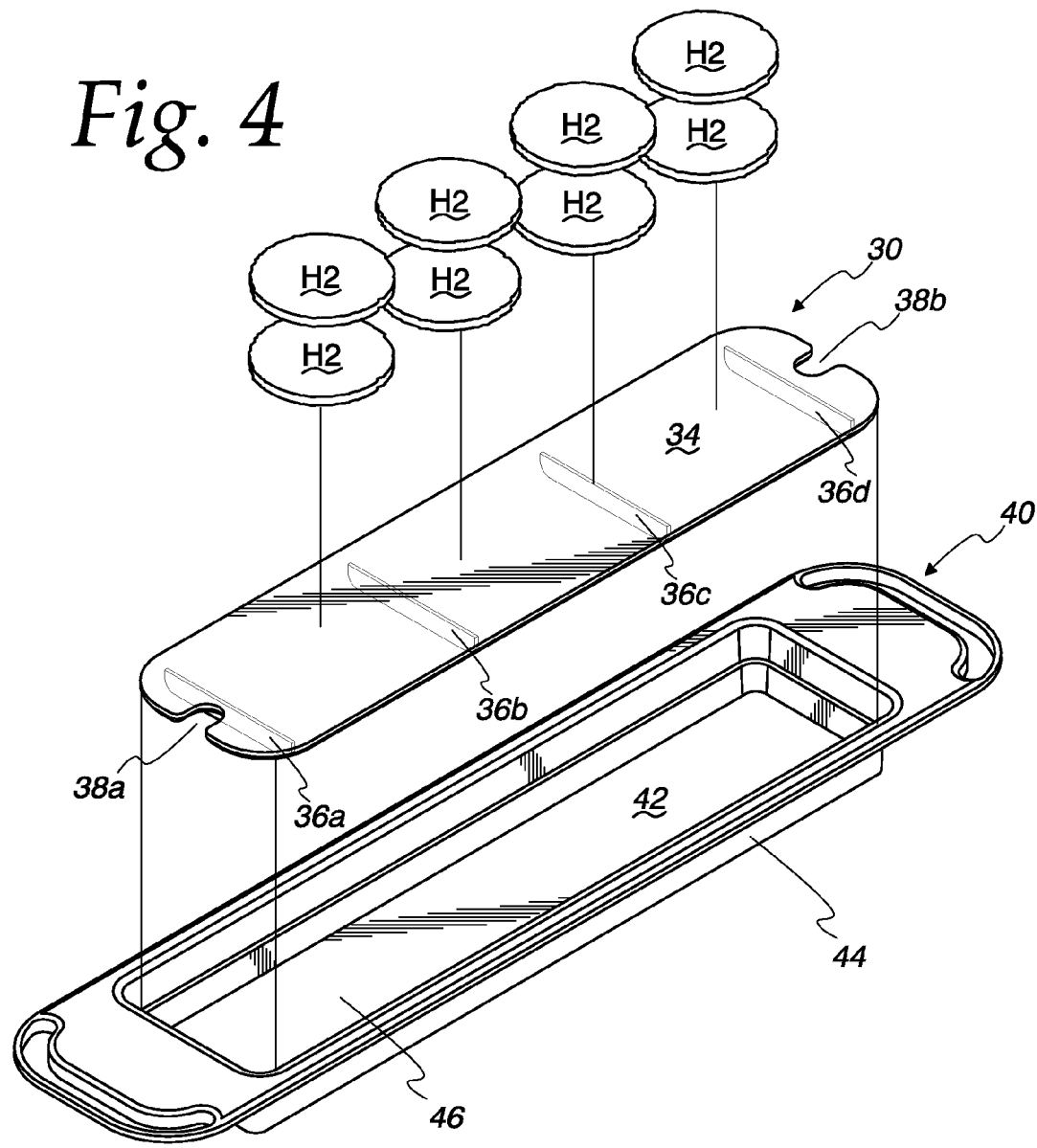

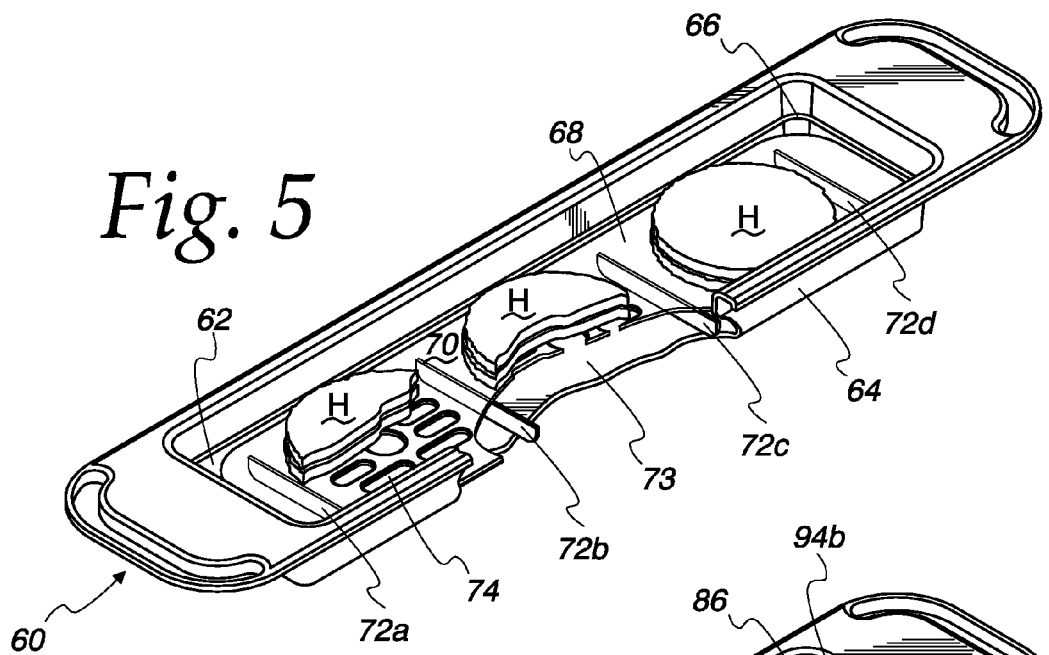
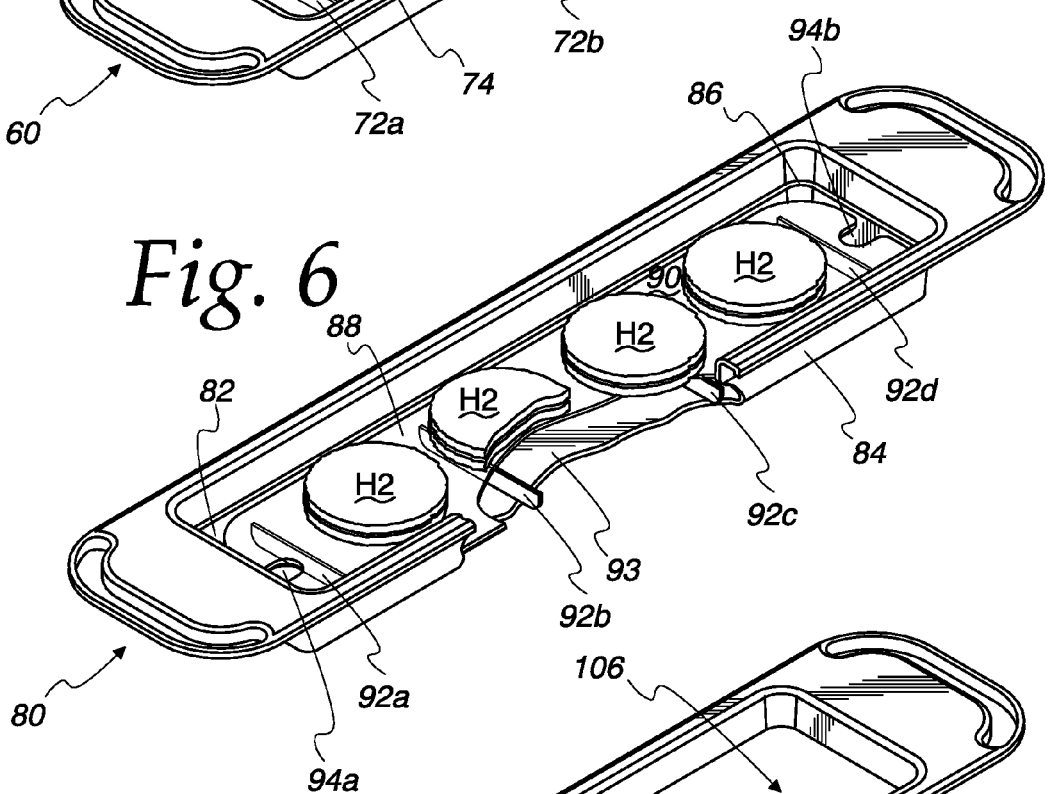
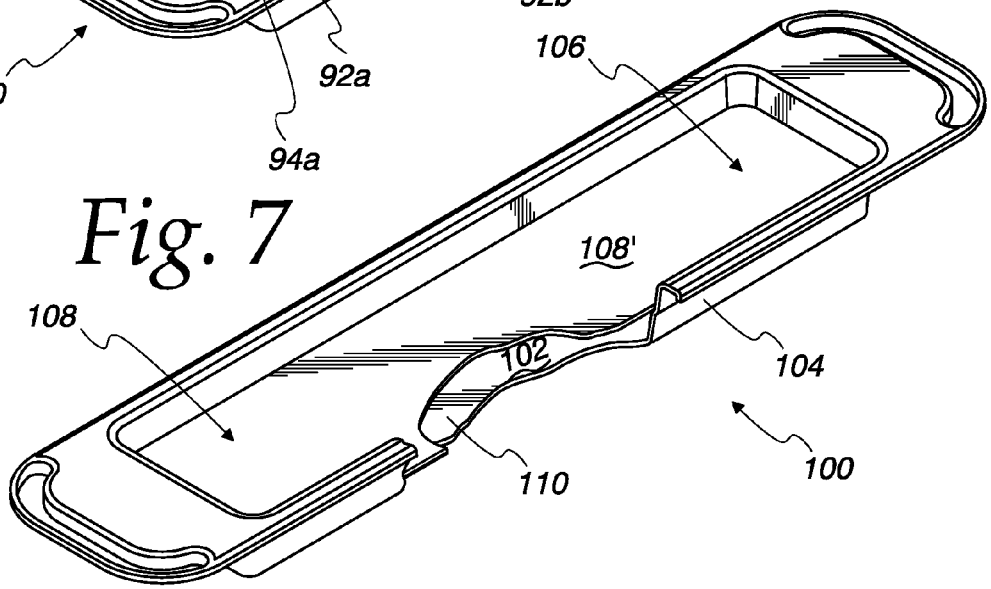

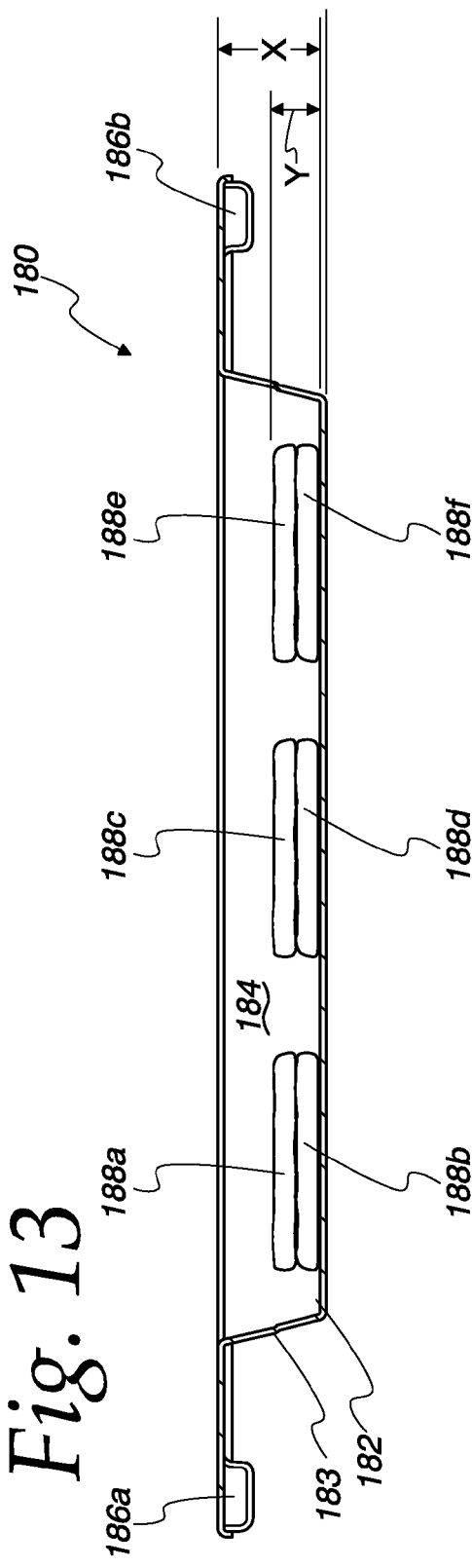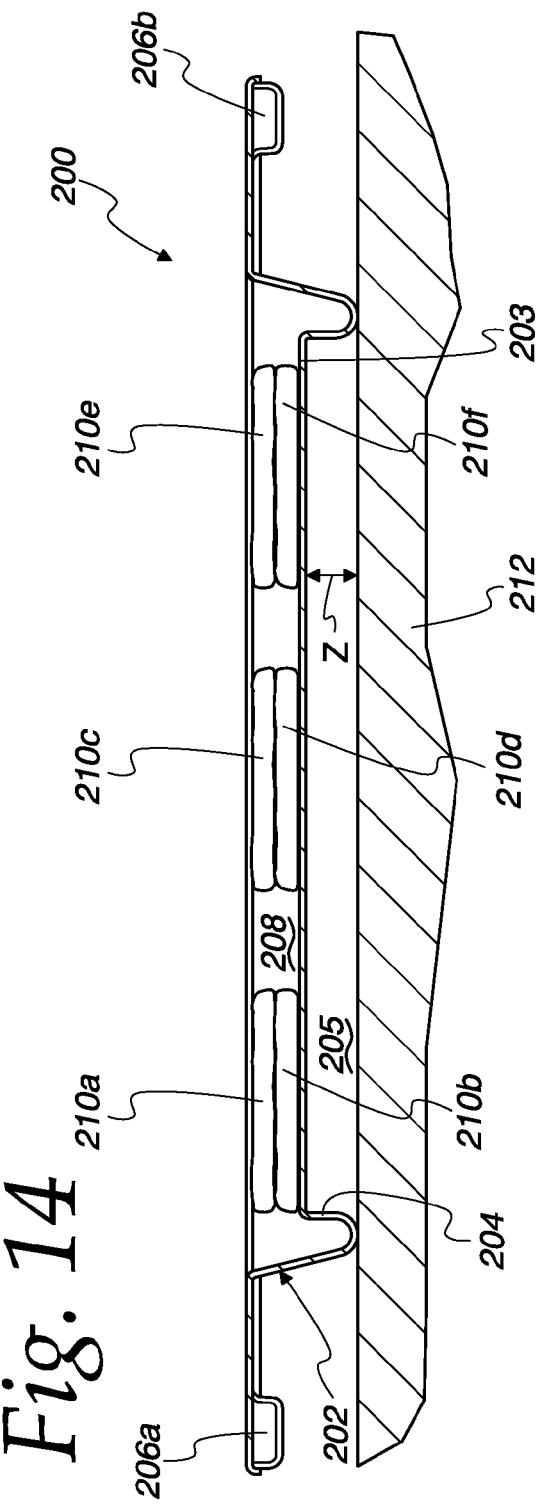

FOOD TRAY AND TRAY INSERT

CROSS-REFERENCE TO RELATED APPLICATION

This application is a divisional of U.S. patent application Ser. No. 11/473,439, filed Jun. 23, 2006, which is pending.

FIELD OF THE INVENTION

The present invention relates to a food tray and a tray insert adapted to be removably located in a food holding compartment that may be used to keep food heated or cooled for an extended period of time and associated methods of using such devices.

BACKGROUND OF THE INVENTION

Many quick-service restaurants must prepare a high volume of food relatively quickly. These restaurants face a number of conflicting factors when striving to efficiently provide fast, palatable, and safe food. Customers expect to receive their food quickly and with predictable and constant high quality. Moreover, the rate of customer demand varies over time, with some periods, such as lunch and dinner times, having extremely high rates of customer demand. However, the kitchens of many quick-service restaurants are of limited size and/or production capacity and have a limited number of cooking devices.

To meet the often competing factors of quick service while producing a consistently high quality product, it is advantageous for one individual to cook a relatively substantial amount of food product in bulk and store the cooked food product in food trays while another individual food preparer transfers food from the trays to a sandwich bun or individual portion sized container to fill customer orders. Typical food products that are of most interest to have readily available for food preparers include sandwich fillings such as hamburger patties, chicken patties, breaded chicken patties, breaded fish fillets, Canadian bacon, pork sausage, and eggs, for example.

Because these prepared food products are not being served immediately upon preparation, it is critical to store the food product so as to maximize potential storage time while optimally maintaining the appearance, taste, temperature, and texture of the food product, as well as minimizing bacterial contamination of the stored food product.

In view of the foregoing, there exists a need for an improved food tray, tray insert, and a method of using the food tray and tray insert that provides longer storage times and optimizes, without significant adverse effects, the appearance, taste, temperature and texture of the pre-cooked food products, as well as minimizes bacterial contamination of such stored food products. Additionally, a need also exists for a food staging device that promotes efficient food handling and use of space within the kitchen of a quick-service restaurant.

SUMMARY OF THE INVENTION

In accordance with the present invention, an improved food tray and method for use thereof, typically in connection with a compartment, and preferably in a heated pass-through compartment, for holding ready-to-serve food product is provided. When used in combination with a compartment of desirable configuration, the food tray is particularly useful for storing over an extended period of time cooked sandwich fillings such as, for example, hamburger patties, fish fillets, Canadian bacon, pork sausage, eggs, and chicken patties, chicken fillets as well as other types of food, including chicken nuggets, biscuits, muffins, and hotcakes. The appearance, taste, temperature and texture of the stored food items may be maintained over extended storage periods while also minimizing risk of bacterial contamination.

In one aspect of the invention, a food tray is provided which is adapted to store individual portions of food over extended storage periods within a storage compartment. The food tray includes a tray body and a tray insert. The tray body includes a first end, a second end, a lower surface tray bottom, and a sidewall structure. The tray bottom and sidewall structure define a tray volume or cavity for the food tray within which a tray insert can be added and within which food product can be stored. The tray insert is positionable within the tray volume and includes an elongated supporting surface and insert supports. The supporting surface and insert supports define a tray insert height wherein the supporting surface is above the tray bottom lower surface and is below the top of the sidewall structure. The lower surface defines a volume between the lower surface and the supporting surface. The supporting surface defines a food holding volume in conjunction with the sidewall structure.

The tray insert is positioned within the food tray leaving only a small gap between the sidewall structure and the supporting surface. While the gap can be as desired, preferably, the gap is less than approximately 0.1 inch, where the tray insert is a functional fit within the food tray. The sidewall structure of the food tray can be any suitable height. The sidewall height can be as desired and preferably, the sidewall structure is approximately 2.125 inches high. The height between the tray bottom and the supporting surface typically can be between approximately 10% and 80% of the overall height of the sidewall structure. For example, the tray insert height can be approximately one inch less than the tray height, where the tray height is the overall height of the sidewall structure. Typically, the height between the tray bottom and the supporting surface is approximately 50% of the overall height of the sidewall structure.

In accordance with another aspect of the invention, the supporting surface is a generally flat surface and comprises a plurality of apertures thereon. The apertures can be any shape or size. Typically, the apertures are arrayed in a generally overall circular shape which overall circular shape corresponds generally to the diameter of hamburger patties to be stored thereon. The apertures can be any shape or size as appropriate for the cooked food that will be stored on the supporting surface. For example, the individual apertures can be slits, generally oblong, rectangular, triangular, or circular. Typically, the individual apertures are generally rectangular, triangular, or circular.

In accordance with another aspect of the invention, hamburger patties are stacked two patties high on the supporting surface. Typically, eight hamburger patties that are weighted ten hamburger patties per pound of meat are stacked two patties high on the supporting surface. Typically, six hamburger patties that are weighted four hamburger patties per pound of meat are stacked two patties high on the supporting surface.

In accordance with another aspect of the invention, the supporting surface comprises a plurality of apertures that form a generally circular shape generally corresponding to the size of hamburger patties to be stored thereon. The supporting surface may contain any number of generally circular shaped series of apertures as appropriate. Typically, the supporting surface has three generally circular shaped series of apertures. Typically, at least one cooked hamburger patty essentially covers the circular shaped series of apertures. Preferably, the food tray comprises a plurality of cooked hamburger patties contained in the tray on the supporting surface and essentially covering the apertures.

In accordance with another aspect of the present invention, a food tray is provided which is adapted to store individual portions of food over extended storage periods within a storage compartment. A tray insert is provided that is an integral part of the tray body. The tray insert comprises a supporting surface. The supporting surface is located above the tray bottom lower surface and below the top of the sidewall structure. The supporting surface and lower surface define a volume, wherein the volume is a sealed void.

In accordance with another aspect of the present invention, a method of storing food, preferably cooked food, within a food tray in a heated compartment is provided. Preferably, the heated compartment is a pass-through compartment having a passageway which extends from an opening on one end of the heated compartment to an opening on an opposite end of the heated compartment.

A food tray is provided which is adapted to store individual portions of food over extended storage periods within a storage compartment. The food tray includes a tray body and a tray insert. The tray body includes a first end, a second end, a lower surface tray bottom, and a sidewall structure. The tray bottom and sidewall structure define a tray volume or cavity for the food tray within which a tray insert can be added and within which food product can be stored. The tray insert is positionable within the tray volume and includes an elongated supporting surface and insert supports. The supporting surface and insert supports define a tray insert height wherein the supporting surface is above the tray bottom lower surface and is below the top of the sidewall structure. The lower surface defines a volume between the lower surface and the supporting surface. The supporting surface defines a food holding volume in conjunction with the sidewall structure. Individual portions of food, such as, for example, hamburger patties, fish fillets, Canadian bacon, pork sausage, eggs, and chicken patties, chicken fillets as well as other types of food, including chicken nuggets, biscuits, muffins, and hotcakes, are placed on the supporting surface. The food tray having the individual portions of food stored therein is placed and stored for a period of time in a heated compartment having an upper compartment surface and a heated lower compartment surface to maintain the temperature of the cooked food products in a desired elevated storage temperature range, wherein the supporting surface is elevated above the heated lower compartment surface. The food tray is maintained during storage so that the top edge of the tray is in close proximity to the upper compartment surface to achieve a gap between the top of the tray and the upper compartment surface of between about 0 and 0.25 inches.

Preferably, the lower volume avoids significant convection heat transfer between said heated lower compartment surface and said individual portions of food. Preferably, the gap is sufficiently sized to restrict water vapor from evaporating from the cooked food in the tray during storage in the compartment.

Typically, the supporting surface is a generally flat surface and may comprise a plurality of apertures thereon. The apertures can be any shape or size. Typically, the apertures are arrayed in a generally overall circular shape which overall circular shape corresponds generally to the diameter of hamburger patties to be stored thereon. The apertures can be any shape or size as appropriate for the cooked food that will be stored on the supporting surface. For example, the individual apertures can be slits, generally oblong, oval, rectangular, triangular, or circular. Typically, the individual apertures are generally rectangular, triangular, or circular.

In accordance with another aspect of the present invention, a method of storing previously cooked hamburger patties after cooking and before incorporation into a hamburger sandwich within a food tray in a heated compartment is provided. Preferably, the heated compartment is a pass-through compartment having a passageway which extends from an opening on one end of the heated compartment to an opening on an opposite end of the heated compartment.

A food tray is provided which is adapted to store individual portions of food over extended storage periods within a storage compartment. The food tray includes a tray body and a tray insert. The tray body includes a first end, a second end, a lower surface tray bottom, and a sidewall structure. The tray bottom and sidewall structure define a tray volume or cavity for the food tray within which a tray insert can be added and within which food product can be stored. The tray insert is positionable within the tray volume and includes an elongated supporting surface and insert supports. The supporting surface and insert supports define a tray insert height wherein the supporting surface is above the tray bottom lower surface and is below the top of the sidewall structure. The lower surface defines a volume between the lower surface and the supporting surface. The supporting surface defines a food holding volume in conjunction with the sidewall structure. Individual portions of food, such as hamburger patties, are placed on the supporting surface. The food tray having the individual portions of food stored therein is placed and stored for a period of time in a heated compartment having an upper compartment surface and a heated lower compartment surface to maintain the temperature of the cooked food products in a desired elevated storage temperature range, wherein the supporting surface is elevated above the heated lower compartment surface. Typically, the cooked hamburger patties are maintained at a storage temperature of approximately 145° F. The food tray is maintained during storage so that the top edge of the tray is in close proximity to the upper compartment surface to achieve a gap between the top of the tray and the upper compartment surface of between about 0 and 0.25 inches to restrict water vapor from evaporating from the cooked hamburger patties in the tray during storage in the compartment.

Preferably, the lower volume avoids significant convection heat transfer between said heated lower compartment surface and said individual portions of food. Preferably, the gap is sufficiently sized to restrict water vapor from evaporating from the cooked food in the tray during storage in the compartment.

Typically, the supporting surface is a generally flat surface and may comprise a plurality of apertures thereon. The apertures can be any shape or size. Typically, the apertures are arrayed in a generally overall circular shape which overall circular shape corresponds generally to the diameter of hamburger patties to be stored thereon. The apertures can be any shape or size as appropriate for the cooked food that will be stored on the supporting surface. For example, the individual apertures can be slits, generally oblong, oval, rectangular, triangular, or circular. Typically, the individual apertures are generally rectangular, triangular, or circular.

Typically, the method of storing previously cooked hamburger patties after cooking and before incorporation into a hamburger sandwich within a food tray in a heated compartment further comprises storing the hamburger patties in the food tray until the hamburger patties are assembled into hamburger sandwiches. Preferably, hamburger patties are stacked on the supporting surface two hamburger patties high. Typically, either six or eight hamburger patties are stored on the supporting surface in the food tray.

In accordance with another aspect of the present invention, a method of making a hamburger sandwich is provided. A plurality of hamburger patties is cooked. A food tray is provided which is adapted to store individual portions of food over extended storage periods within a storage compartment. The food tray includes a tray body and a tray insert. The tray body includes a first end, a second end, a lower surface tray bottom, and a sidewall structure. The tray bottom and sidewall structure define a tray volume or cavity for the food tray within which a tray insert can be added and within which food product can be stored. The tray insert is positionable within the tray volume and includes an elongated supporting surface and insert supports. The supporting surface and insert supports define a tray insert height wherein the supporting surface is above the tray bottom lower surface and is below the top of the sidewall structure. The lower surface defines a volume between the lower surface and the supporting surface. The supporting surface defines a food holding volume in conjunction with the sidewall structure. Individual portions of food, such as previously cooked hamburger patties are placed on the supporting surface. The food tray having the individual portions of food stored therein is placed and stored for a period of time into a heated compartment having an upper compartment surface and a heated lower compartment surface to maintain the temperature of the cooked food products in a desired elevated storage temperature range, wherein the supporting surface is elevated above the heated lower compartment surface. Typically, the cooked hamburger patties are maintained at a storage temperature of approximately 145° F. The food tray is maintained during storage so that the top edge of the tray is in close proximity to the upper compartment surface to achieve a gap between the top of the tray and the upper compartment surface of between about 0 and 0.25 inches to restrict water vapor from evaporating from the cooked hamburger patties in the tray during storage in the compartment. Thereafter, the cooked hamburger patties are removed from the tray when needed for assembly into hamburger sandwiches and the hamburger patties are assembled into hamburger sandwiches.

Typically, assembling the hamburger patties into sandwiches comprises applying condiments and placing the hamburger patties into buns.

The supporting surface may comprise a plurality of apertures which may be any potential shape, such as ovals, circles, slits, or rectangles. Typically, the apertures are arranged in a generally circular shape, such that hamburger patties essentially cover the apertures.

Typically, hamburger patties are stored on the supporting surface two hamburger patties high. Any number of hamburger patties can be stored in the food tray. Typically, six or eight hamburger patties are stored on the supporting surface of the food tray.

BRIEF DESCRIPTION OF THE FIGURES

The accompanying drawings form part of the specification and like numerals are employed to designate like parts throughout the same.

FIG. 3 is a perspective view of an embodiment of the food tray and tray insert in accordance with the invention.

FIG. 4 is a perspective view of another embodiment of the food tray and tray insert in accordance with the invention.

FIG. 5 is a perspective view with a cut-away portion of another embodiment of the food tray and tray insert in accordance with the invention.

FIG. 6 is a perspective view with a cut-away portion of another embodiment of the food tray and tray insert in accordance with the invention.

FIG. 7 is a perspective view with a cut-away portion of another embodiment of the food tray in accordance with the invention.

FIG. 13 is a side elevation view of another embodiment of the tray in accordance with the invention.

FIG. 14 is a side elevation view of another embodiment of the tray in accordance with the invention.

DETAILED DESCRIPTION OF THE INVENTION

Figure 1:
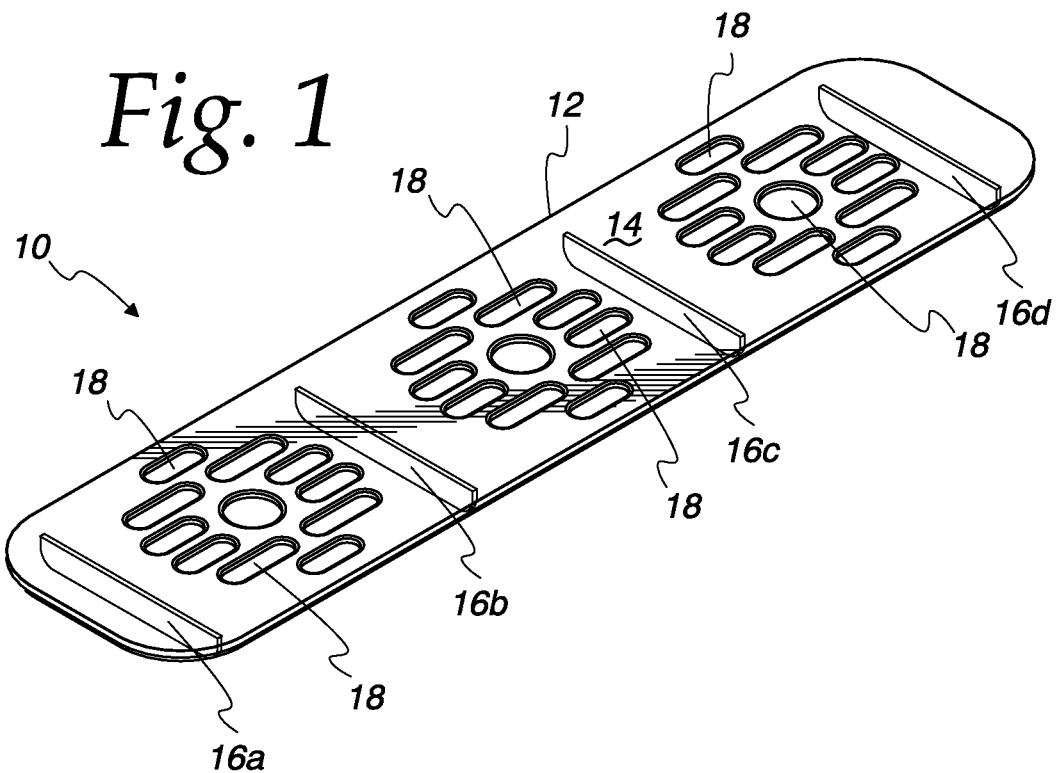
FIG. 1 is a perspective view of an embodiment of the tray insert in accordance with the invention.

While this invention is susceptible of embodiment in many different forms, there is shown in the drawings and described in detail herein, several specific embodiments with the understanding that the present disclosure is to be considered as exemplifications of the principles of the invention and is not intended to limit the invention to the embodiments illustrated.

U.S. Pat. Nos. 5,590,586, 5,724,886, 5,947,012, 6,119,587, 6,209,447, 6,358,548 and 6,607,766 are hereby expressly incorporated by reference.

Referring to the figures generally, and in particular to FIG. 1, a tray insert 10 according to the present invention is shown generally as having a tray insert body 12. Tray body 12 comprises a supporting surface 14 and a plurality of insert supports 16 *a-d*. Insert supports 16 *a-d* give tray insert 10 height. Supporting surface 14 is a generally flat surface. Supporting surface 14 further comprises a plurality of apertures 18 to form a generally circular shape generally corresponding to the size of cooked food portions to be stored thereon. Apertures 18 can be any shape, size, or number as appropriate for the cooked food that will be stored on supporting surface 14. Typically, apertures 18 define a total void space opening of at least 30%. More typically, apertures 18 define a total void space opening of at least 50%.

Figure 2:
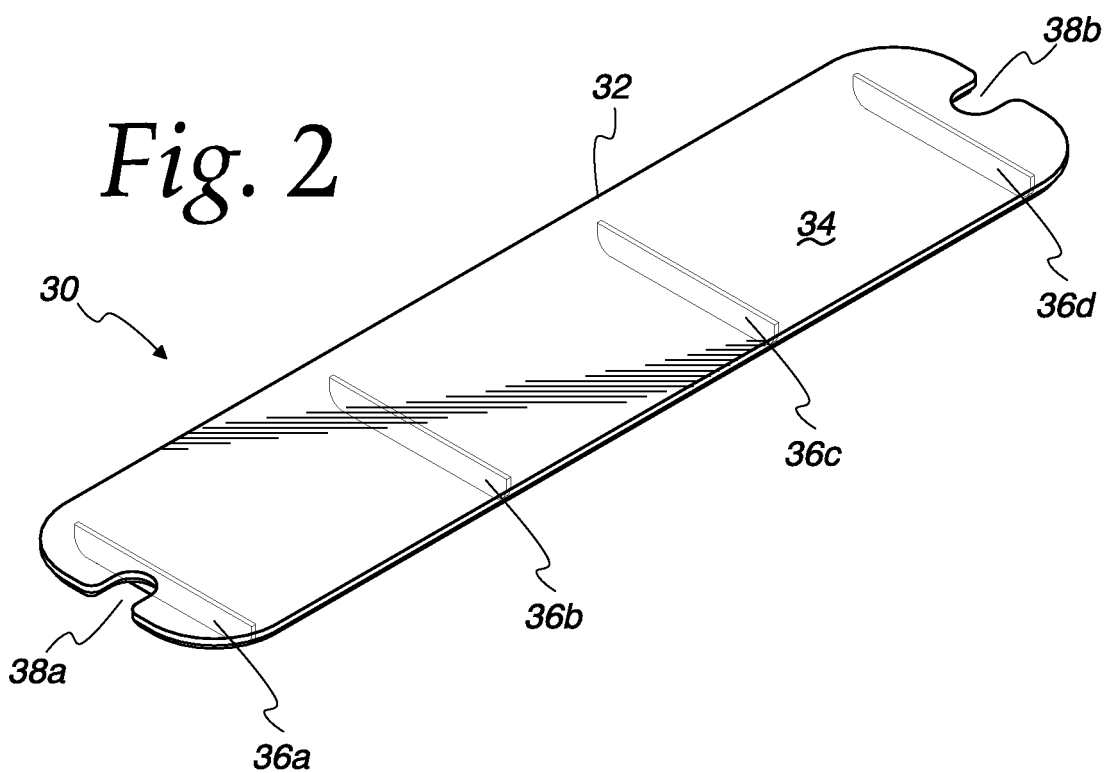
FIG. 2 is a perspective view of another embodiment of the tray insert in accordance with the invention.

Referring to the figures generally, and in particular to FIG. 2, a tray insert 30 according to the present invention is shown generally as having a tray insert body 32. Tray body 32 comprises a supporting surface 34 and a plurality of insert supports 36 *a-d*. Insert supports 36 *a-d* give tray insert 30 height. Supporting surface 34 is a generally flat surface that would support a cooked food portion. Tray body 32 may further comprise at least one finger opening 38 *a-b*. Finger openings 38 *a-b* allow for tray insert 30 to be easily placed into or removed from a food tray. Finger openings 38 *a-b* can be any shape to allow a finger and/or thumb to easily grip tray insert 30. Typically, finger openings 38 *a-b* are semi-circular in shape.

Referring in particular to FIG. 3 and FIG. 4, a food tray 40 is provided according to the present invention and is shown generally as having a tray bottom lower surface 42. Food tray 40 further comprises a sidewall structure 44. Sidewall structure 44 and tray bottom lower surface 42 define a tray volume 46. Tray insert 10 or 30 can be inserted into food tray 40. Hamburger patties H and H2 sit on top of supporting surfaces 14 and 34, respectively.

Referring in particular to FIG. 5, a food tray 60 is provided according to the present invention and is shown generally as having a lower surface 62. Food tray 60 further comprises a sidewall structure 64. Sidewall structure 64 and lower surface 62 define a tray volume 66. Food tray 60 further comprises a tray insert 68, inserted into food tray 60. Tray insert 68 comprises a supporting surface 70 and insert supports 72 *a-d*. Any number of insert supports can be present as necessary to support tray insert 68. Typically, insert supports 72 *a-d* prevent tray insert 68 from sagging in the middle, keeping supporting surface 70 essentially generally straight. Supporting surface 70 and lower surface 62 define a lower volume 73. Lower volume 73 can be any percentage of tray volume 66 as desired, from about 0% to about 90%. Typically, lower volume 73 is approximately 50% of the overall tray volume.

Tray insert 68 further comprises a plurality of apertures 74. Any number of apertures as desired may be on tray insert 68. The plurality of apertures may be any potential, suitable shape, such as, for example, ovals, circles, slits, or rectangles. Typically, the apertures are arranged in a generally circular shape, such that hamburger patties essentially cover the apertures. Typically, the apertures are arranged to form a generally circular shape approximately the size of a hamburger patty. Typically, the apertures will be essentially completely covered by at least one hamburger patty. Tray insert 68 further comprises a plurality of hamburger patties H located on supporting surface 70 and essentially completely covering apertures 74.

Referring in particular to FIG. 6, a food tray 80 is provided according to the present invention and is shown generally as having a lower surface 82. Food tray 80 further comprises a sidewall structure 84. Sidewall structure 84 and lower surface 82 define a tray volume 86. Food tray 80 further comprises a tray insert 88, inserted into food tray 80. Tray insert 88 comprises a supporting surface 90 and insert supports 92 *a-d*. Any number of insert supports can be present as necessary to support tray insert 88. Typically, insert supports 92 *a-d* prevent tray insert 88 from sagging in the middle, keeping supporting surface 90 essentially generally straight. Supporting surface 90 and lower surface 82 define a lower volume 93. Lower volume 93 can be any percentage of tray volume 86 as desired, typically, for example, from about 0% to about 90% of the overall tray volume. Typically, lower volume 93 is approximately 50% of the overall tray volume. Tray insert 88 further comprises finger grips 94 *a-b* on opposite ends of tray insert 88. Finger grips 94 *a-b* allow tray insert 88 to be easily removed from or inserted into food tray 80. Finger grips 94 *a-b* can be any size and shape to facilitate a typical human finger. Typically, the finger grips are semi-circular in shape, as shown in finger grips 94 *a-b*. Tray insert 88 further comprises a plurality of hamburger patties H2 located on supporting surface 90.

Referring in particular to FIG. 7, a food tray 100 is provided according to the present invention and is shown generally as having a lower surface 102 and supporting sidewalls 104. Lower surface 102 and supporting sidewalls 104 define a tray volume 106. Food tray 100 further comprises an integral tray insert 108. Tray insert 108 is an integral part of food tray 100 and is not removable from food tray 100. Tray insert 108 comprises a supporting surface 108'. Supporting surface 108' of tray insert 108 and lower surface 102 of tray 100 together define a lower volume 110. Lower volume 110 can be any percentage of tray volume 106 as desired, typically, for example, from about 0% to about 90% of the overall tray volume. Typically, lower volume 110 is approximately 50% of the overall tray volume. Lower volume 110 allows supporting surface 108' of tray insert 108 to be elevated above lower surface 102, such that any food portions placed upon supporting surface 108 will not be directly adjacent any heat source contacting lower surface 102. By defining lower volume 110 and not directly contacting any food portions placed on supporting surface 108 with the heated lower surface 102, the food portions can be stored in food tray 100 for extended periods of time.

Figure 8:
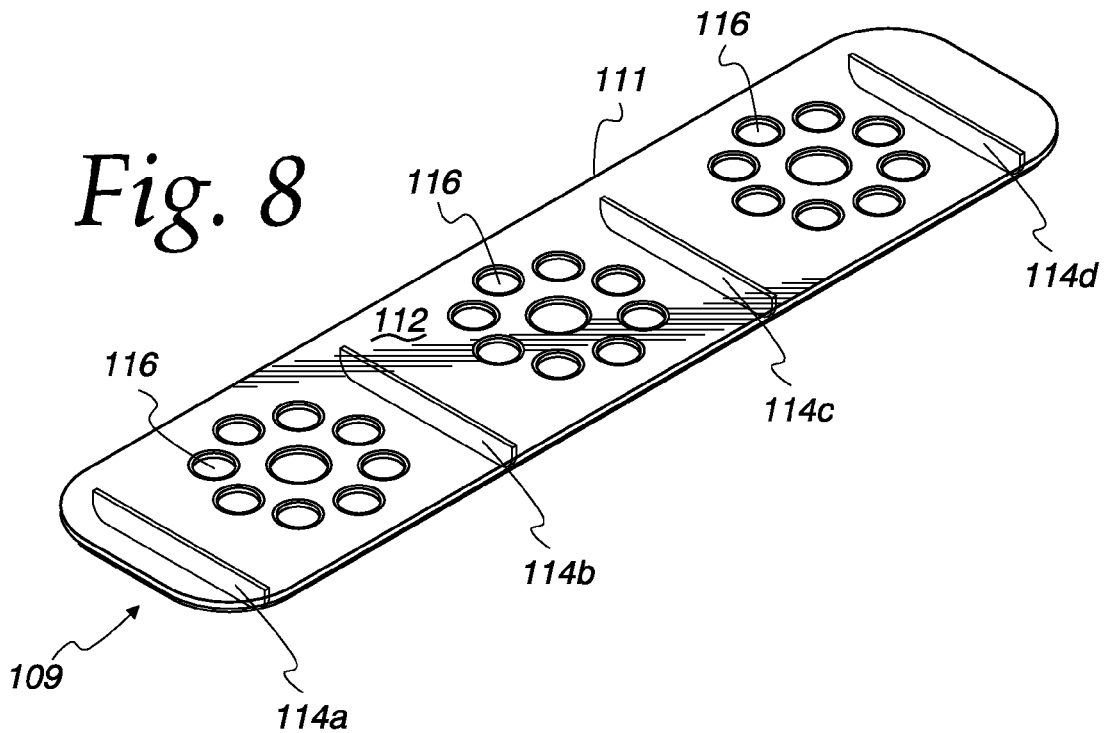
FIG. 8 is a perspective view of another embodiment of the tray insert in accordance with the invention.

Referring to FIG. 8, a tray insert 109 according to the present invention is shown generally as having a tray insert body 111. Tray body 111 comprises a supporting surface 112 and a plurality of insert supports 114 *a-d*. Insert supports 114 *a-d* give tray insert 109 height. Supporting surface 112 is an essentially generally flat surface. Supporting surface 112 further comprises a plurality of apertures 116 to form a generally circular shape generally corresponding to the diameter or footprint of cooked food portions to be stored thereon. Apertures 116 are generally circular in shape as appropriate for the cooked food that will be stored on supporting surface 112 and form an overall generally circular shape approximately the size and shape of a hamburger patty. Typically, apertures 116 define a total void space opening of at least 30%. More typically, apertures 116 define a total void space opening of at least 50%.

Figure 9:
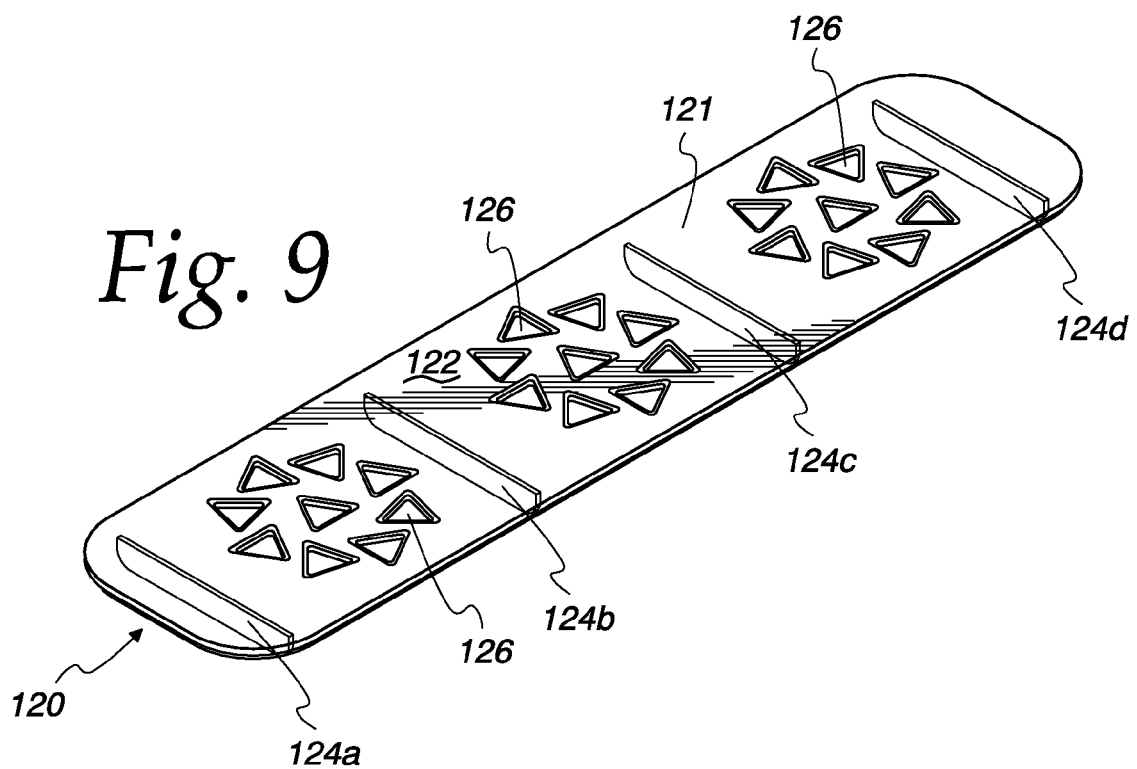
FIG. 9 is a perspective view of another embodiment of the tray insert in accordance with the invention.

Referring to FIG. 9, a tray insert 120 according to the present invention is shown generally as having a tray insert body 121. Tray body 121 comprises a supporting surface 122 and a plurality of insert supports 124 *a-d*. Insert supports 124 *a-d* give tray insert 120 height. Supporting surface 122 is an essentially generally flat surface. Supporting surface 122 further comprises a plurality of apertures 126 to form a generally circular shape generally corresponding to the size of the cooked food portions to be stored thereon. Apertures 126 are generally triangular in shape as appropriate for the cooked food that will be stored on supporting surface 122 and form an overall generally circular shape approximately the size and shape of a hamburger patty. Typically, apertures 126 define a total void space opening of at least 30%. More typically, apertures 126 define a total void space opening of at least 50%.

Referring to FIG. 13, a tray body 180 is provided. Tray body 180 comprises a tray bottom lower surface 182 and supporting sidewalls 183. Lower surface 182 and supporting sidewalls 183 define a tray volume 184. Tray body 180 further comprises finger grips 186 *a-b*. Individual food portions 188 *a-f* are contained within food tray 180, located on lower surface 182. Tray body 180 has an overall height X. Individual food portions have a food portion height Y. Food portion height Y can be any height equal to or less than overall height X. Typically, food portion height Y is one half of overall height X.

Referring to FIG. 14, a tray body 200 is provided. Tray body 200 comprises supporting sidewalls 202, a lower surface 203, and tray legs 204. Lower surface 203 and tray legs 204 further define a lower volume 205. Tray body 200 further comprises finger grips 206 *a-b*. Lower surface 203 and supporting sidewalls 202 further define a tray volume 208. Individual food portions 210 *a-f* are located on lower surface 203 within tray volume 208. Tray body 200 is resting on a lower compartment surface 212. Lower volume 205 is further bound and defined by lower compartment surface 212. Lower volume 205 has a supporting surface height Z. Height Z can be any suitable height to prevent direct contact of lower surface 203 with lower compartment surface 212.

Figure 10:
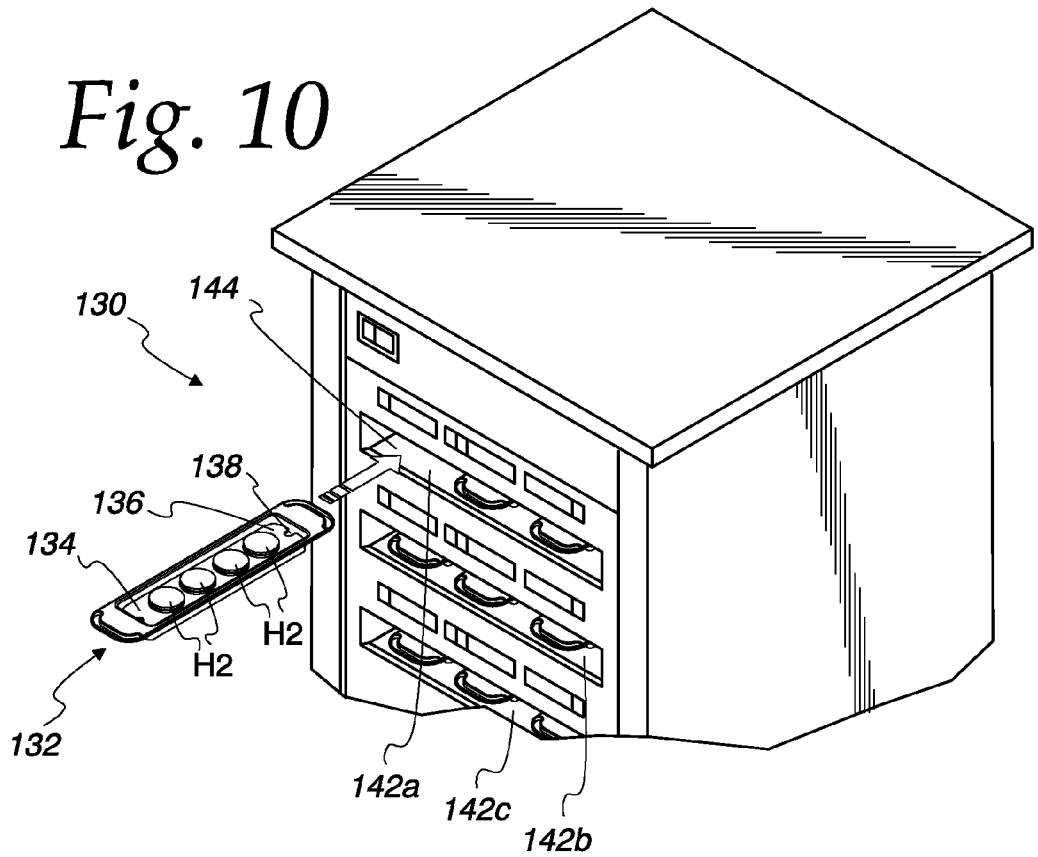
FIG. 10 is a perspective view of a method of using the food tray and tray insert in accordance with the invention.

Referring to FIG. 10, a method of storing individual portions of food is provided. A universal holding cabinet 130 is provided to store individual portions of food. A food tray 132 is provided. Food tray 132 comprises a tray insert 134 that is elevated above the lower surface of food tray 132. Tray insert 134 comprises a supporting surface 136 and finger grips 138. Supporting surface 136 allows for the storage and placement of individual portions of food H2. Individual portions of food H2 are placed on supporting surface 136. Food tray 132 is inserted into one of heated compartments 142 a-c in universal holding cabinet 130. Heated compartments 142 a-c comprise a heated lower compartment surface 144. Food tray 132 is stored in one of heated compartments 142 a-c for a period of time, maintaining the temperature of the cooked food products in a desired elevated storage temperature range.

Figure 11:
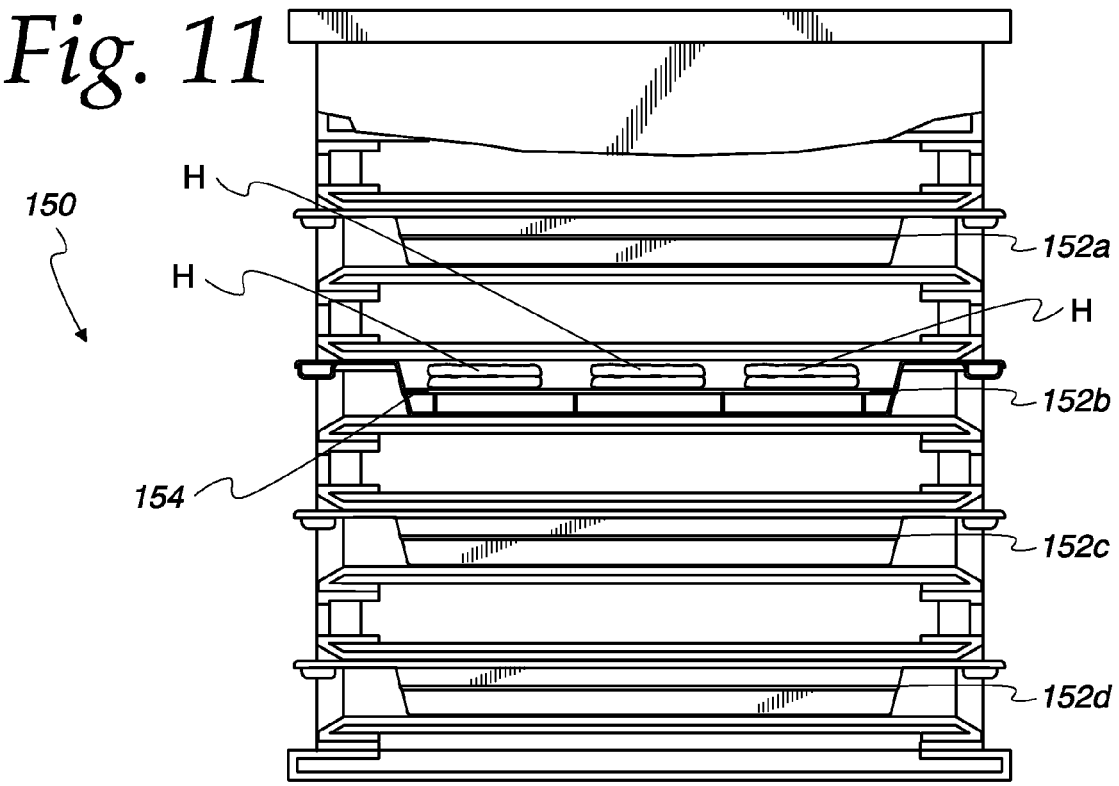
FIG. 11 is a perspective view of another embodiment of the method of using the food tray and tray insert in accordance with the invention.

Referring to FIG. 11, a method of storing previously cooked hamburger patties after cooking and before incorporation into a hamburger sandwich is provided. A universal holding cabinet 150 is provided to store individual portions of food. Food trays 152 a-d are provided. Universal holding cabinet 150 is a pass-through design, allowing food trays 152 a-d to be inserted into and removed from either side of universal holding cabinet 150. Food trays 152 a-d further comprise supporting surface 154. Individual hamburger patties H are placed upon supporting surface 154 and inside food tray 152 b.

Figure 12:
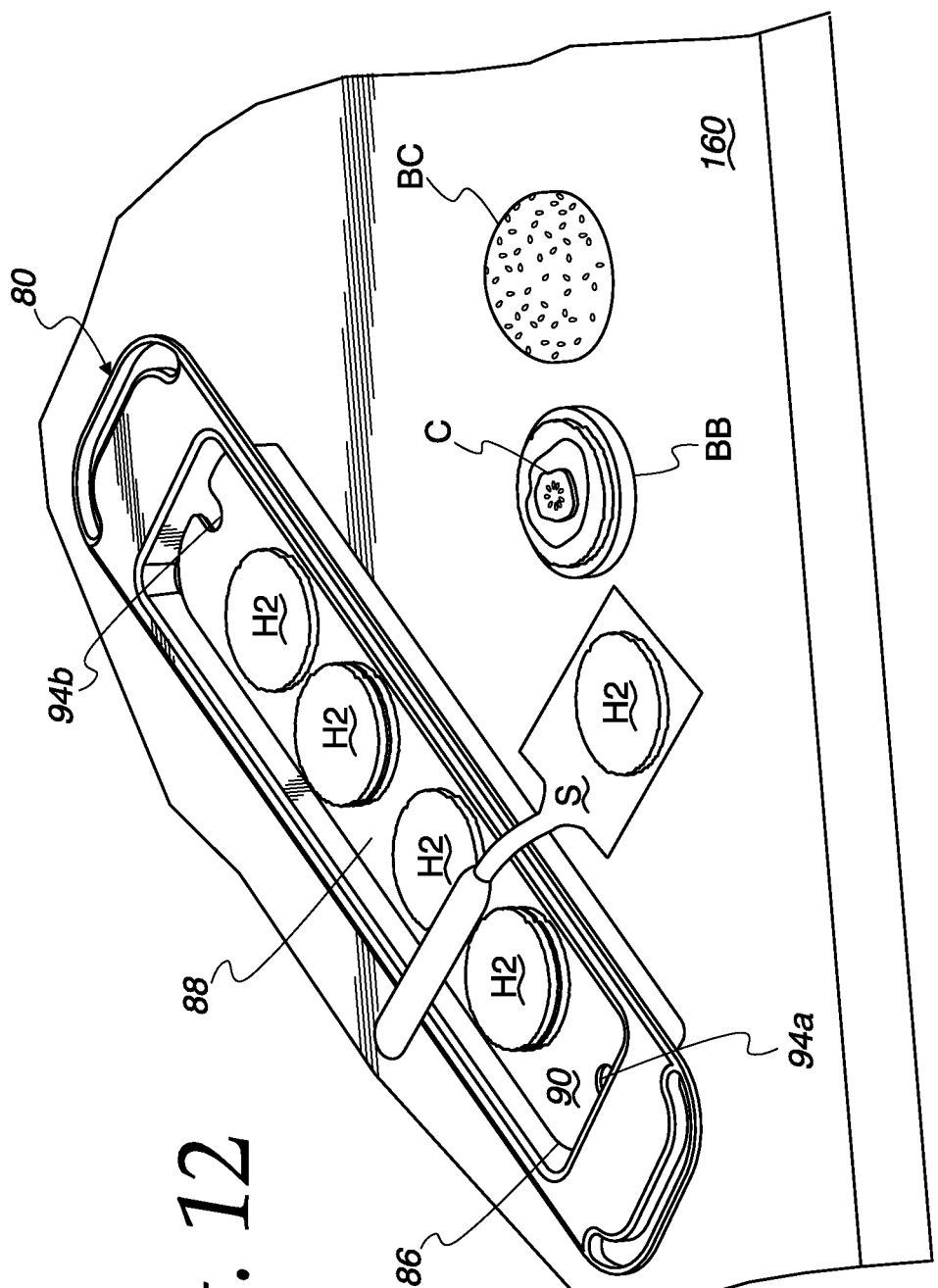
FIG. 12 is a perspective view of a method of making a sandwich in accordance with the invention.

Referring to FIG. 12, a method of making a hamburger sandwich is provided. Food tray 80 is provided which comprises tray volume 86 and tray insert 88. Tray insert 88 further comprises supporting surface 90 and finger grips 94 a-b. Hamburger patties H2 are supported upon supporting surface 90. Hamburger patty H2 is on spatula S and is removed from food tray 80. Preparation of the hamburger sandwich occurs in work space 160. The hamburger patties H2 are assembled into hamburger sandwiches by applying condiments C and a bottom bun BB and a bun cap BC. Bottom bun BB, bun cap BC, condiments C, and hamburger patty H2 are placed together to prepare a hamburger sandwich.

While the invention has been described with respect to certain preferred embodiments, as will be appreciated by those skilled in the art, it is to be understood that the invention is capable of numerous changes, modifications and rearrangements, and such changes, modifications and rearrangements are intended to be covered by the following claims.

What is claimed is:

1. A food tray for storing individual portions of food comprising:
   a tray body having a first end and a second end, a lower surface and a sidewall structure defining an open top of the tray body, a substantially uniform tray height and a tray volume within said tray body; and
   a tray insert removably positioned in the tray volume below the top of the sidewall structure and comprising an elongated, generally flat supporting surface and insert supports defining a tray insert height between said tray lower surface and said tray insert supporting surface;
   said supporting surface being above said lower surface, and wherein said tray insert height is at least about 0.2125 inches above the lower surface;
   said supporting surface having a plurality of series of spaced apart apertures extending therethrough, each series of spaced apart apertures arranged in a shape corresponding to the shape of a food item to be placed on the respective series of apertures, and at least one of said series of spaced apart apertures having a food item placed thereon to essentially cover the series of apertures, the apertures providing a void space in the supporting surface area of at least about 30%;
   said lower surface and said supporting surface defining a lower volume therebetween, and the supporting surface defining a food holding volume in conjunction with said sidewall structure for storing food items completely contained in the food holding volume, the lower volume being between about 10% and about 80% of the tray volume;
   said tray body being removably placeable in a heated compartment having an upper compartment surface and a heated lower compartment surface to maintain the temperature of the cooked food items in a desired elevated storage temperature range so that said supporting surface is elevated above said heated lower compartment surface and a top edge of the tray is between about 0 and 0.25 inches below the upper compartment surface to restrict water vapor from leaving the tray volume and water from evaporating from the cooked food in the tray when said tray is in the heated compartment.

2. The food tray of claim 1, wherein said supporting surface comprises a generally flat surface.

3. The food tray of claim 1, wherein said series of apertures form a circular shape defined by a plurality of apertures arranged in a circular pattern generally corresponding to the size of hamburger patties to be placed thereon.

4. The food tray of claim 1, wherein said apertures are at least generally rectangular.

5. The food tray of claim 1, wherein said apertures are at least generally circular.

6. The food tray of claim 1, wherein said tray insert height is approximately one inch less than said tray height.

7. The food tray of claim 1, further comprising hamburger patties stacked two patties high.

8. The food tray of claim 1, wherein said tray body is constructed from a material having a low heat capacity, for ease of handling by a person when the food item on the supporting surface in the heated compartment is maintained at an elevated temperature of up to about 210° F.

9. The food tray of claim 8, wherein said material comprises polycarbonate.

10. A food holding cabinet comprising
    a heated compartment having an upper compartment surface and a heated lower compartment surface; and
    a food holding tray removably positioned in the heated compartment, the food holding tray comprising
       a tray body having a first end and a second end, a lower surface and a sidewall structure defining an open top of the tray body, a substantially uniform tray height and a tray volume within said tray body; and
       a generally flat supporting surface being positioned at a supporting surface height above said lower surface and below the top of the sidewall structure, said supporting surface height being at least about 0.2125 inch;
       said lower surface and said supporting surface defining a lower volume therebetween, and the supporting surface defining a food holding volume in conjunction with said sidewall structure for storing food items completely contained in the food holding volume, the lower volume being between about 10% and about 80% of the tray volume; and
    said tray body being removably placed in the heated compartment to maintain the temperature of the cooked food items in a desired elevated storage temperature range, said supporting surface being elevated above said heated lower compartment surface, and a top edge of the tray is between about 0 and 0.25 inches below the upper compartment surface to restrict water vapor from leaving the tray volume and from evaporating from the cooked food in the tray when said tray is in the heated compartment.

11. The food holding cabinet of claim 10, further comprising a removable tray insert, the removable tray insert comprising said supporting surface; and insert supports defining said supporting surface height;

said supporting surface further comprising a plurality of series of spaced apart apertures extending through, each series of spaced apart apertures arranged in a shape corresponding to the shape of a food item to be placed on the respective series of apertures to essentially cover the series of apertures, the apertures providing a void space in the supporting surface area of at least about 30%.

12. The food holding cabinet of claim 10, said supporting surface being integral to the tray body and fixed at said supporting surface height.

13. The food holding cabinet of claim 12, wherein the volume between the lower surface and the supporting surface is a sealed void.

14. The food holding cabinet of claim 10, wherein said supporting surface height is approximately one inch less than said tray height.

15. The food holding cabinet of claim 10, wherein said tray body is constructed from a material having a low heat capacity, for ease of handling by a person when the food item on the supporting surface in the heated compartment is maintained at an elevated temperature of up to about 210° F.

16. The food tray of claim 1, the lower volume being about 50% of the tray volume.

17. The food holding cabinet of claim 10, the lower volume being about 50% of the tray volume.

18. The food tray of claim 1, said plurality of series of spaced apart apertures of the tray insert comprising a finger opening for insertion of a human finger below said support surface for removal of the tray insert.

19. The food holding cabinet of claim 10, the tray insert further comprising a finger opening in said support surface configured for insertion of a human finger below said support surface for removal of the tray insert.

20. The food holding cabinet of claim 11, the plurality of series of spaced apart apertures of the tray insert comprising a finger opening for insertion of a human finger below said support surface for removal of the tray insert.

* * * * *